United States Patent [19]

Prinz et al.

[11] Patent Number: 5,203,944
[45] Date of Patent: Apr. 20, 1993

[54] METHOD FOR FABRICATION OF THREE-DIMENSIONAL ARTICLES BY THERMAL SPRAY DEPOSITION USING MASKS AS SUPPORT STRUCTURES

[76] Inventors: Fritz B. Prinz, 5801 Northumberland St.; Lee R. Weiss, 6558 Darlington Rd., both of, Pittsburgh, Pa. 15217; Duane A. Adams, 2325 N. Richmond St., Arlington, Va. 22207

[21] Appl. No.: 774,610

[22] Filed: Oct. 10, 1991

[51] Int. Cl.$^5$ .............................................. B32B 31/00
[52] U.S. Cl. .................................... 156/247; 156/256; 156/263; 156/265; 156/280; 156/289; 156/300; 156/58; 427/272; 427/282
[58] Field of Search .................... 156/58, 59, 234, 237, 156/247, 256, 263, 265, 278, 289, 300, 280; 427/259, 272, 282

[56] References Cited

U.S. PATENT DOCUMENTS

| | | | |
|---|---|---|---|
| 3,957,552 | 5/1976 | Ahn et al. | 427/259 |
| 4,420,365 | 12/1983 | Lehrer | 427/259 |
| 4,424,271 | 1/1984 | Keel et al. | 427/259 |
| 4,665,492 | 5/1987 | Masters | 364/468 |
| 4,752,352 | 6/1988 | Feygin | 156/630 |
| 4,775,092 | 10/1988 | Edmonds | 228/222 |
| 4,842,186 | 5/1989 | Doyle et al. | 228/222 |
| 4,894,505 | 1/1990 | Malone et al. | 219/76.1 |

FOREIGN PATENT DOCUMENTS

0322257 6/1989 United Kingdom .................... 39/42

OTHER PUBLICATIONS

"Three Dimensonal Printing: Ceramic Toolgn and Parts DIrectly From a CAD Model" by Emanuel E. Sachs, Michael Cima, James Cornie, David Brancazio and Alan Curodeau submitted to the National Rapid Prototyping Conference, Dayton, Ohio, Jun. 4–5, 1990.
"Automated Fabrication of Net Shape Microcrystallien and Composite Metal Structures Without Molds" by David Fauber, pp. 461–466, published in Manufacturing Processes, Systems and Machines, 14th Conference on Production, Research and Technology, National Science Foundation, Ann Arbor, Mich. Oct. 6–9, 1987.
"A Rapid Tool Manufacturing System Based on Stereolithography and Thermal Spraying" by Lee E. Weiss, E. Levent Gursoz, F. B. Prinz, Paul S. Fussell, Swami Mahalingham and E. P. Patrick, published by the American Society of Mechanical Engineers, 1990, pp. 40–48.
"DC Arc Plasma-The Future in the P/M Industry?" by Douglas H. Harris published by ASP-Materials, Inc., Dayton, Ohio.
Microwave Materials and Devices, J. K. Dillion, Jr., Chairman, "Polycrystalline Ferrite Films for Microwave Applications Deposited by Arc-Plasma" by D. H. Harris, R. J. Janowiecki, C. E. Semler, M. C. Willson and J. T. Cheng, published in the Journal of Applied Physics, vol. 41, No. 2, Mar. 1, 1970.

*Primary Examiner*—David A. Simmons
*Assistant Examiner*—Paul M. Rivard
*Attorney, Agent, or Firm*—Buchanan Ingersoll; Lynn J. Alstadt

[57] ABSTRACT

A method for forming a three-dimensional article by thermal spraying utilizes a plurality of masks having a support layer with a removable liner thereon and a cut-away portion. The masks correspond to cross-sections normal to a centerline through the object. A set of masks defines all cross-sections through the object. A first mask is placed above a work surface and sprayed with a deposition material forming a first layer portion of the deposition material within the cut-out and second layer portion on the liner. The liner and second layer portion of deposition material thereon are removed. A second mask is placed over the remaining support portion of the first mask and sprayed with deposition material therein. Then the liner portion of the second mask and deposition material therein are removed. This process is repeated until the three dimensional article is formed. Then the mask support portions surrounding the article are removed from the article.

14 Claims, 2 Drawing Sheets

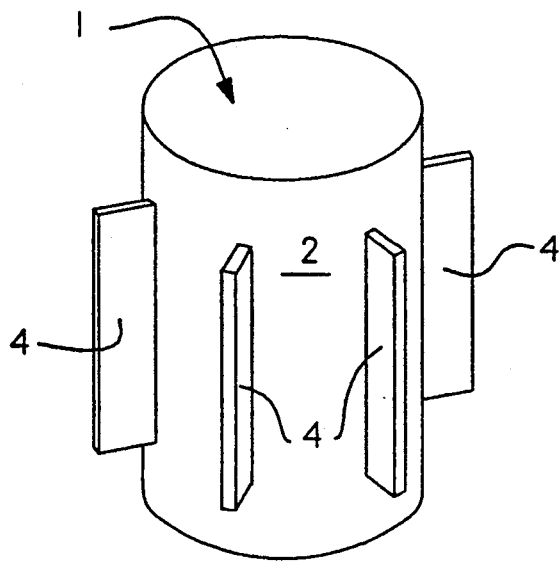
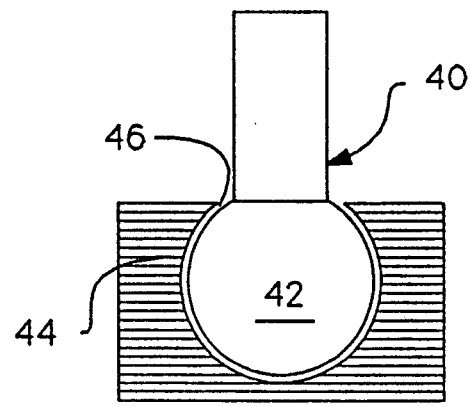
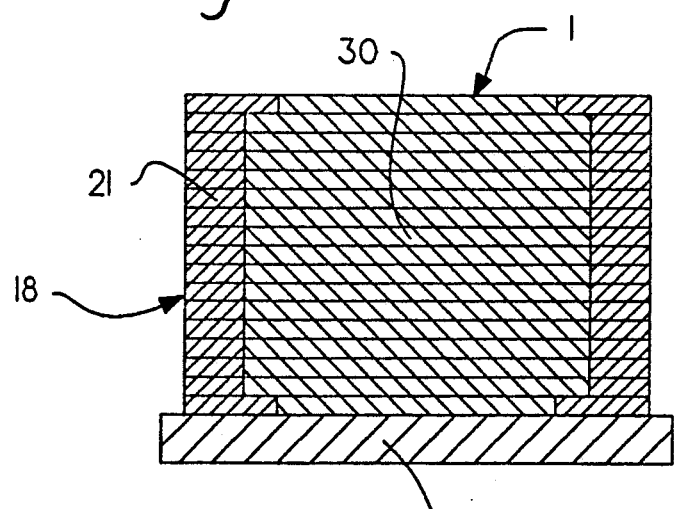
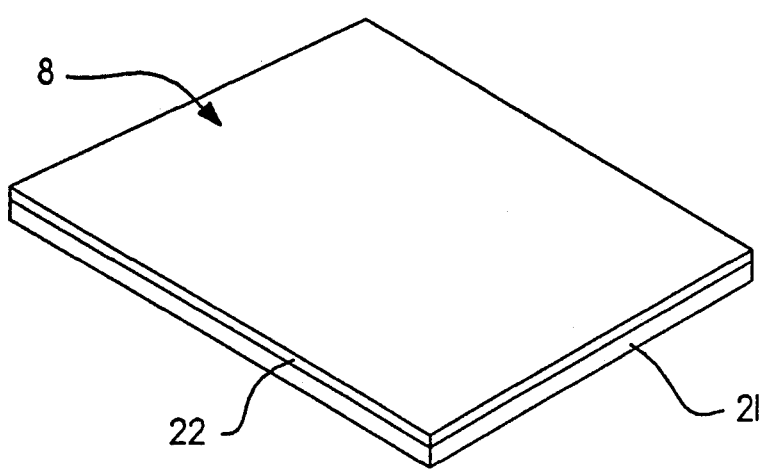

METHOD FOR FABRICATION OF THREE-DIMENSIONAL ARTICLES BY THERMAL SPRAY DEPOSITION USING MASKS AS SUPPORT STRUCTURES

FIELD OF INVENTION

The invention relates to a method and apparatus for creating a three-dimensional object by thermal spray deposition of metal, ceramic, plastic or composite material using masks.

BACKGROUND OF THE INVENTION

Several methods have been proposed and utilized for creating three-dimensional objects by the incremental material build up of thin layers. These processes include lamination, selective laser sintering, ballistic powder metallurgy, three-dimensional printing, stereolithography and near net thermal spraying. Lamination involves the simple process of cutting layers of a selected material and then bonding those layers together. The layers may be pre-cut to shapes corresponding to a cross section through the article to be created. Alternatively, standard shapes of material can be stacked and bonded together. Then, the assembled structure is cut or machined to produce the desired shape. In U.S. Pat. No. 4,752,352, Michael Feygin proposes a computer controlled method and apparatus for forming a laminated object. He provides a supply station, a work station for forming a material into a plurality of layers for lamination, an assembly station for stacking the layers in sequence into a three-dimensional object, a station for bonding the laminations to complete the formation of the three-dimensional object and a control station. In his patent, Mr. Feygin discloses a method in which the laminations are cut from a roll of material lifted, stacked and bonded under the direction of a computerized controller. The layers are bonded together by adhesive or brazing. This and other lamination techniques have several disadvantages. First, the bond between layers is critical and limits the strength of the object. Second, creation of each layer of the laminate also results in the production of significant amounts of waste materials. Third, the resulting object has a layered or serrated edge which must be removed by sanding or grinding. Finally, lamination is suitable for only those materials which can be formed into thin layers which can be bonded together.

In laser sintering, a laser is used to cure a starting material into a certain configuration according to the manner in which the laser is applied to that material. Stereolithography is a more recent yet similar process which creates plastic prototype models directly from a vat of liquid photocurable polymer by selectively solidifying it with a scanning laser beam. An example of this method is described in European Patent 322 257. Both of these methods require a substantial amount of curable raw material. In both cases the laser must be carefully controlled to achieve the desired shape. In some applications, the laser typically does not fully cure each cross section. Rather, the laser cures the boundary of a section and then cures an internal structure or honeycomb that traps the uncured fluid. Thereafter, the article must be subjected to final curing under separate ultraviolet lights or heat treatment. Additional post processing, such as careful sanding and grinding, is required for making smooth, accurate surfaces.

In ballistic powder metallurgy beams of particles are directed to the coordinates of a three-dimensional object in a three dimensional coordinate system. A physical origination seed to which the particulate matter is attracted is required. The process may use a beam of particles directed to the origination seed which builds the particles upward from that seed. Alternatively, one can use an energy beam which attracts the particulate matter already in the environment to the seed or another coordinate. Such a system is disclosed by William E. Masters in U.S. Pat. No. 4,665,492. This method cannot be used to make objects having undercuts therein without creating support structures at the same time. Normally, the support structures are created with the particle beam during the creation of the object. Such support structures must be removed by cutting, grinding or machining.

Three-dimensional printing is another technique similar to ballistic powder metallurgy. One variation of this technique creates layers of particles to produce a three-dimensional image in much the same manner that an ink jet printer produces two-dimensional images. The technique relies upon thermal shock or drop on demand material delivery techniques. A thermal shock technique forms a particle by vaporizing a small area of the fluid directly behind the nozzle. The drop on demand nozzle includes a piezo electric element to constrict the cavity thereby forcing a drop past the nozzle plate. In both instances the material is directed to a work surface in a manner to build up the article. This technique can only be used for certain kinds of materials.

In another variation of three-dimensional printing a series of two-dimensional layers are created by adding a layer of powder on top of a work surface. The powdered layer is selectively joined where the part is be formed by ink jet printing of a binder material. The work surface is then lowered and another layer of powder is spread out and selectively joined. The layering process is repeated until the part is completely printed. Following a heat treatment the unbonded powder is removed leaving the fabricated part. Although this technique has been proposed for metal, ceramic and plastic materials, it is limited to those materials to which a reliable binder can be applied.

None of the just described fabrication techniques have been successfully used to make steel parts. Of the previously described processes only laser sintering, three-dimensional printing and ballistic powder metallurgy have been proposed for steel part fabrication. However, objects made from these three methods are porous. Such porosity is not acceptable for most steel parts.

The art has attempted to make objects by spraying layers of metal on a substrate. Problems have occurred in that the layers have tended to camber and possibly to peel apart from the substrate. Therefore, one must have a release agent or compatible substrate.

In a paper titled "A Conceptual Framework For A 'Mask And Deposits' Thermal Spray Shape Deposition System" presented at the DARPA Workshop on Manufacturing at the University of Utah on Feb. 4, 1991, Lee E. Weiss and Fritz B. Prinz, two of the present inventors, disclose a method and apparatus to manufacture a three-dimensional object by incremental material build up of thin layers. Each layer is composed of two portions. A first portion shape represents a cross sectional slice of the three dimensional object being built and is composed of the desired deposition material. The second portion is the complement of the object shape of the first portion and serves as a structure which supports the growing object form and as a self-anchoring substrate. Both portions are applied by thermal deposition spray over disposable masks. At least two masks are needed to form each layer, a primary mask for the first portion and a support mask for the second portion. The masks are used only to shape the sprayed material in each cross-sectional layer. All masks are removed after each layer is shaped. This method is also the subject of pending U.S. patent application Ser. No. 620,745 filed Dec. 3, 1990.

BRIEF DESCRIPTION OF THE INVENTION

We provide a method in which only one mask is used for each layer. The first mask is placed on a substrate or work surface. Then a gun sprays the primary material over that mask. Each mask is composed of a support material layer having a disposable liner thereon. At least one mask corresponds to each cross section through an article such that there is at least one mask for every parallel cross section normal to a center line through the article. Each mask is first cut to a desired shape and then placed on a substrate or growing article. A primary material is sprayed over the entire mask to form a layer of primary material having a depth substantially the same as the thickness of the mask support material layer. The mask's disposable liner and deposition material thereon are removed leaving a layer of sprayed primary material and adjacent mask support material. Subsequent masks are placed in accordance with a predetermined sequence, sprayed and the disposable liner of each mask is removed so that a layered structure is built up which contains the object made of the deposition material surrounded by a stack of mask support layers. After the part is completely built the masking support layers are removed leaving the created object. We prefer to use a mask composed of a double sided adhesive tape having a non-stick, high gloss liner thereon.

Other objects and advantages of the invention will become apparent in connection with the description of the preferred embodiments shown in the following figures in which comparable parts carry the same reference numerals.

DESCRIPTION OF THE DRAWINGS

FIG. 1 is a perspective view of an article to be created.

FIG. 2 is a cross sectional view of the article shown in FIG. 1 surrounded by a supporting mask material.

FIG. 3 is a perspective view of mask material from which different masks will be cut to make the article of FIG. 1.

FIG. 12 is a cross-sectional view of a ball joint which can be made with the present invention.

DESCRIPTION OF THE PREFERRED EMBODIMENTS

Figure 4:
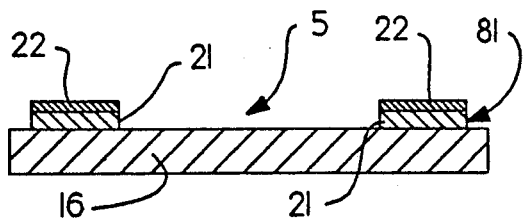
FIG. 4 is a cross-sectional view of the mask used to make the article of FIG. 1.

In FIG. 1 we show an article 1 which can be manufactured in accordance with our method. This article is comprised of a tubular body 2 having radially projecting vanes 4. To make the object of FIG. 1 we deposit a material on a substrate using a series of masks to define cross-sectional layers through the article. A sheet or roll of material is cut into individual masks 8 shown in FIG. 3 which are cut to have open areas 5 shown in FIG. 4 and placed on a work surface or substrate 16 or on a growing object structure 18. The mask material is comprised of a mask support material portion 21 and liner portion 22 as shown in FIG. 3. Because we are depositing thin layers, the masks preferably have a thickness of about 0.008 inches with the support layer being about 0.005 inches thick and the liner being about 0.003 thick. We have found that 3M Industrial Double-Sided Adhesive Tape can be used as a masking material for making an object of zinc and most other low modulus metals. Foil and plastic having a liner therein are also suitable.

Figure 5:
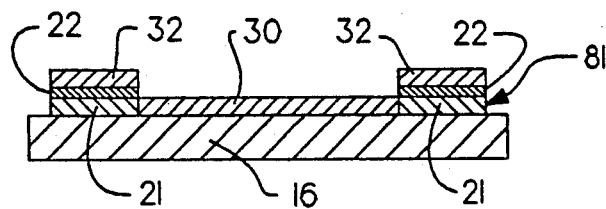
FIG. 5 is a cross-sectional view of the first mask of FIG. 4 after a layer of metal has been deposited.
Figure 6:
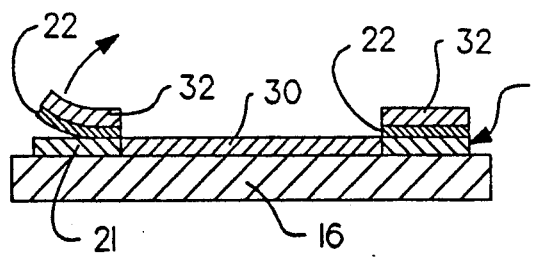
FIG. 6 is a diagram similar to FIG. 5 showing the liner portion of the mask being removed.
Figure 7:
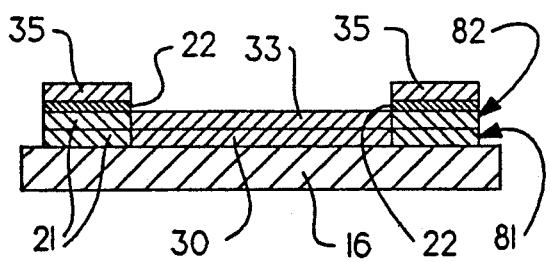
FIG. 7 is a diagram similar to FIG. 5 after the second layer of metal has been deposited.
Figure 11:
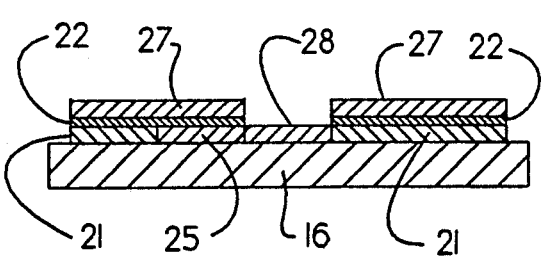
FIG. 11 is a cross-sectional view of the structure of FIG. 9 after being sprayed with a second material.

To make a selected object we cut a set of masks so that there is at least one mask for every cross-section taken normal to a longitudinal axis through the object to be made. We then place the first mask 81 on a substrate 16 as shown in FIG. 4. Then, we apply a material over the first mask. For metal parts we prefer to deposit the material using thermal spray deposition. Spraying forms a layer of primary material having one portion 30 within the open area 5 of the mask 81 and a second portion 32 on the liner portion 22 of the mask as shown in FIG. 5. The liner portion 22 and metal thereon 32 are removed as shown in FIG. 6. Then the second mask 82 is placed on the supporting portion of the first mask, and a second layer of primary material comprised of portions 33 and 35 is sprayed to form the structure shown in FIG. 7. The liner portion 22 and metal thereon are removed and the process is repeated until the final structure shown in FIG. 2 is formed. The supporting portions of each mask could contain sufficient adhesive so that adjacent mask portions will stick together. Alternatively, mask layers could be adhered to one another with heat or spot welding.

The art has observed in some metal spray processes that residual stress develops in the sprayed metal layer causing the layer to camber and possibly to peel. To relieve the stress the art has shot peened such layers. The technique is only successful in situations where shot is evenly applied over the layer. Since our layers are flat, we can use this technique. It is also possible to relieve the stress by induction heating. Such heating is easier to accomplish on flat layers rather than on curved and irregular surfaces.

Upon completion of the process, one will have a block 18 of primary material 30 and supporting mask material 21, a cross section of which is shown in FIG. 2. Because we have left a portion of the mask material 21 with each layer of primary the deposition material, we are able to create intricate shapes and parts having undercut portions. For the particular object of FIG. 1, the supporting mask material 21 supports the deposited veins 4. After the product has been fully formed, the mask support material 21 is removed by abrasion, chemical etching, melting, burning or other process which will not adversely affect the product.

Figure 8:
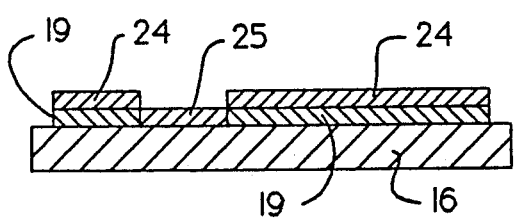
FIG. 8 is a cross-sectional view of a conventional mask on a substrate after being sprayed with a first material.
Figure 9:
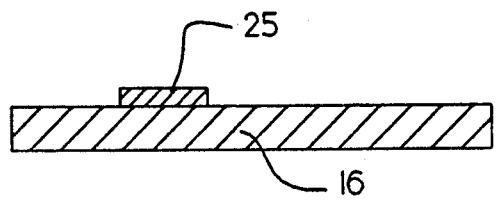
FIG. 9 is a cross-sectional view similar to FIG. 8 after the conventional mask has been removed.
Figure 10:
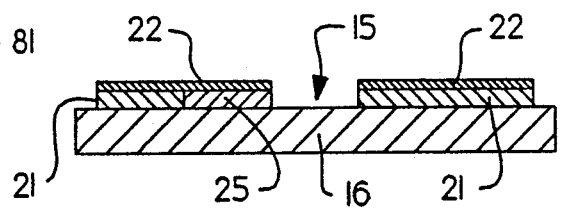
FIG. 10 is a cross-sectional view of the deposited material of FIG. 9 having a second mask placed therearound.

We can also produce articles made of two or more different materials. This can be done using the mask sequence illustrated in FIGS. 8 thru 11. We begin with the conventional mask 19 placed on a substrate or work surface 16. Mask 19 corresponds to a first transverse section through the article to be manufactured. There is an opening in the mask which corresponds to a portion of the first transverse section containing the first material. As shown in FIG. 8 the first material is sprayed or otherwise applied over the mask. This creates a first portion 25 of the first primary material within the opening in mask 19. A second portion 24 of the first primary material covers mask 19. After the first material has been sprayed, mask 19 and the material thereon 24 are removed leaving a first portion 25 of the first primary material on the substrate 16 as shown in FIG. 9. Next we place a second mask 21 having liner 22 thereon on work surface 16. An opening is provided in mask 21 which corresponds to the area of the article containing both the first material 25 and a second material 27. As shown in FIG. 10, when mask 21 is positioned on the work surface the previously deposited first primary material 25 will be within the opening 15 of the mask 21. The mask is preferably cut so that the liner portion 22 covers the deposited first primary material 25. Then, a second primary material is sprayed over mask 21. This leaves a first portion 28 within the opening area 15 in the mask. That second primary material is adjacent to the previously deposited first primary material 25. A second portion of the second primary material 27 is on top of liner 22. As in the previous embodiment liner 22 is removed carrying with it the material 27 thereon. The sequence shown in FIGS. 8 thru 11 is then repeated for each subsequent layer until the structure is made and thereafter the remaining mask material is removed.

The solid-freeform fabrication system disclosed here would also permit the fabrication of complete functional assemblies containing two or more mating parts in one process without the requirement of discrete assembly operations. In FIG. 12 we show a ball joint 40 having a ball head 42 in a socket 44 separated by space 46. This part can be made such that ball head 42 is one material and socket 44 is a second material. During fabrication a mask support material is positioned to fill space 46 and surround head 42 and socket 44. For example, the socket 44 may be steel, the ball head 44 a composite, and the support mask material can be a metal foil. Upon completion of the spraying, the workpiece is heated to melt away the mask support material, leaving the assembly shown in FIG. 11.

While we have described certain preferred embodiments of our apparatus and method, it should be distinctly understood that our invention is not limited thereto, but may be variously embodied with the scope of the following claims.

We claim:

1. A method for the fabrication of a three dimensional article comprising the steps of
   a) creating a set of masks, each mask comprised of a support layer and a removable liner thereon, having a cut-away portion through the support layer and liner, each mask corresponding to at least a portion of a cross section through the article such that there is at least one mask for every parallel cross section through the article normal to a centerline through the article;
   b) placing on a work surface at least one mask;
   c) applying deposition material over the mask to form a layer of deposition material having a first layer portion within the cut-away area and adjacent the support layer of the mask and a second layer portion on the liner;
   d) removing the liner and deposition material thereon after applying the deposition material thereby leaving the support layer and the first layer portion;
   e) placing another mask selected from the set of masks on the support layer;
   f) applying deposition material over the another mask;
   g) removing the liner portion of the another mask and any deposition material thereon;
   h) repeating steps e) through g) until the article has been formed and;
   i) removing the support layers from the article.

2. The method of claim 1 wherein the deposition material is one of a metal, a ceramic, a plastic and a composite thereof.

3. The method of claim 1 wherein pairs of masks define at least some of the cross sections through the article with each pair of masks defining a single cross section.

4. The method of claim 1 wherein the masks are cut from a continuous roll of mask material.

5. The method of claim 1 wherein at least two different materials are also used for the deposition material.

6. The method of claim 1 wherein at least one of the deposition materials is applied with a spray source.

7. The method of claim 1 also comprising the step of shot peening at least a portion of the sprayed deposition material.

8. The method of claim 1 wherein the masks are made from double backed tape.

9. The method of claim 1 wherein the masks are comprised of a foil having a liner thereon.

10. The method of claim 9 also comprising the step of welding together adjacent layers of mask support layers.

11. The method of claim 1 wherein the masks are comprised of a plastic sheet having a liner thereon.

12. The method of claim 1 also comprising the step of welding together adjacent layers of mask support layers.

13. The method of claim 1 wherein the masks have a thickness of from 0.001 to 0.020 inch.

14. The method of claim 1 also comprising the steps of
   creating a second set of secondary masks, each secondary mask having a cut away portion therethrough and corresponding to a portion of a selected cross section through the article;
   for each selected cross section placing one secondary mask on one of the work surfaces and the support layer;
   applying a second deposition material over each placed secondary mask to form a layer of second deposition material having a first portion within the cut away area of the placed secondary mask and a second portion on the placed secondary mask; and
   removing the placed secondary mask and second portion of second deposition material thereon.

* * * * *

UNITED STATES PATENT AND TRADEMARK OFFICE
CERTIFICATE OF CORRECTION

PATENT NO. : 5,203,944

DATED : April 20, 1993

INVENTOR(S) : FRITZ B. PRINZ, LEE E. WEISS, DUANE A. ADAMS

It is certified that error appears in the above-identified patent and that said Letters Patent is hereby corrected as shown below:

Title page:
At [76] Inventors, change "Lee R. Weiss" to --Lee E. Weiss--.

At Other Publications, line 1, change "Toolgn" to --Tooling--.

At Other Publications, line 2, change "DIrectly" to --Directly--.

At Other Publications, line 6, change "Microcrystallien" to --Microcrystalline--.

Column 6, line 46, claim 12, change "1" to --11--.

Signed and Sealed this

Fourth Day of January, 1994

Attest:

BRUCE LEHMAN

Attesting Officer

Commissioner of Patents and Trademarks